H. A. HOUSEMAN.
CLUTCH SHIFTING MECHANISM FOR CIRCULAR KNITTING MACHINES.
APPLICATION FILED JULY 20, 1916.

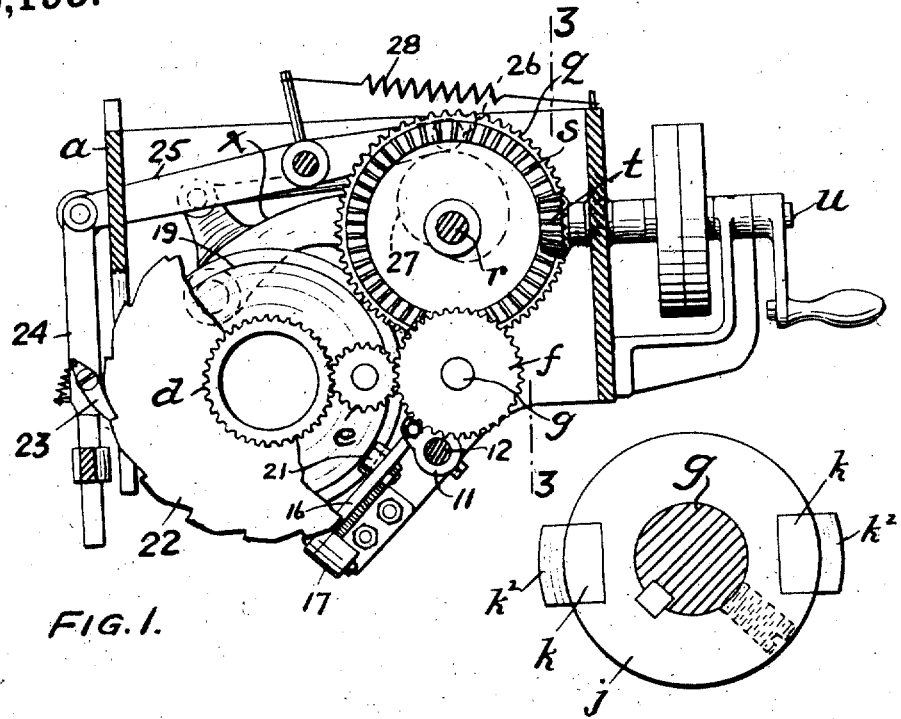
FIG. 1.
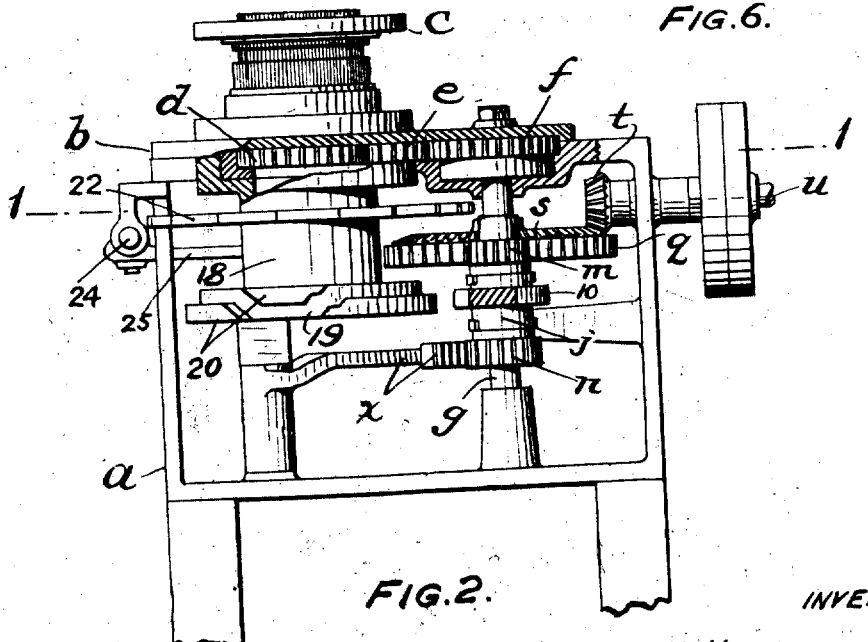
FIG. 6.
FIG. 2.

1,213,199.

Patented Jan. 23, 1917.
3 SHEETS—SHEET 2.

WITNESS:

INVENTOR
Harry A. Houseman
BY Frank S. Busser
ATTORNEY.

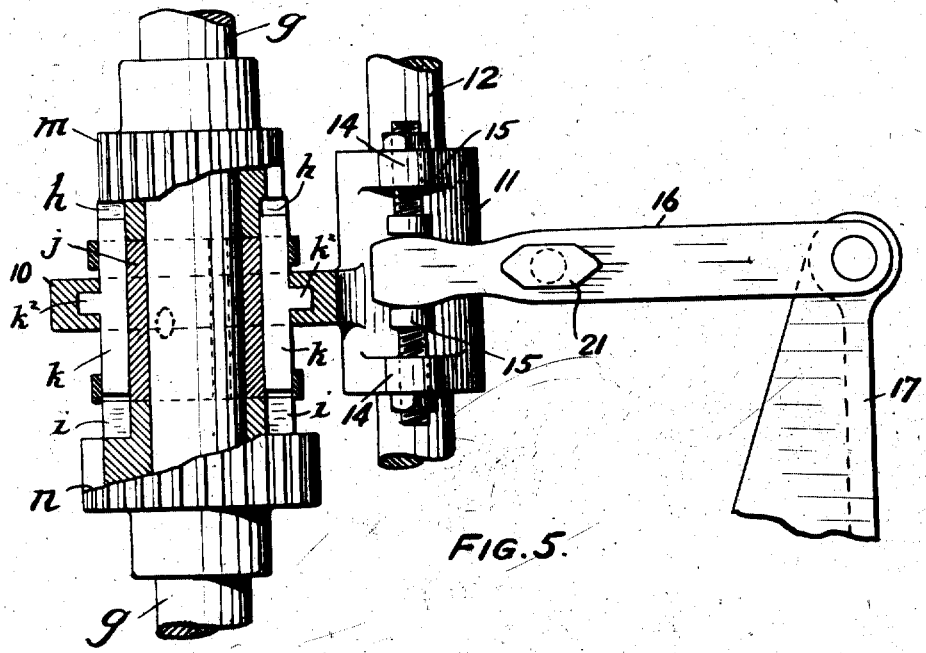
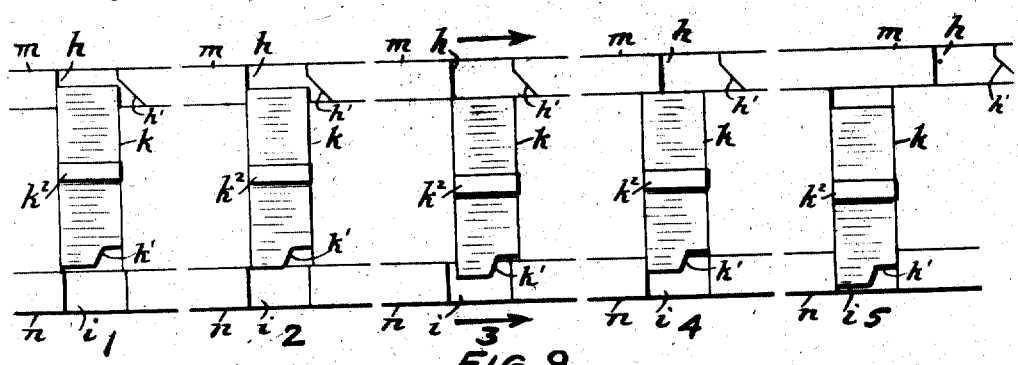
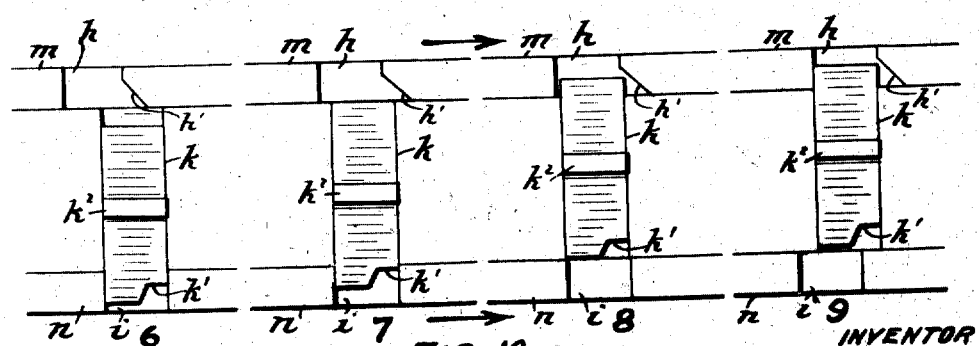

UNITED STATES PATENT OFFICE.

HARRY A. HOUSEMAN, OF PHILADELPHIA, PENNSYLVANIA, ASSIGNOR TO STANDARD MACHINE COMPANY, OF PHILADELPHIA, PENNSYLVANIA, A CORPORATION OF PENNSYLVANIA.

CLUTCH-SHIFTING MECHANISM FOR CIRCULAR-KNITTING MACHINES.

1,213,199.  Specification of Letters Patent.  Patented Jan. 23, 1917.

Application filed July 20, 1916. Serial No. 110,287.

*To all whom it may concern:*

Be it known that I, HARRY A. HOUSEMAN, a citizen of the United States, residing at Philadelphia, county of Philadelphia, and State of Pennsylvania, have invented a new and useful Improvement in Clutch-Shifting Mechanism for Circular-Knitting Machines, of which the following is a full, clear, and exact description, reference being had to the accompanying drawings, which form a part of this specification.

The object of my invention is to provide new and better mechanism for shifting from rotation to oscillation and vice versa in the operation of an ordinary circular knitting machine. Several means are in use for effecting this shift. Thus, it is common to gear the needle cylinder to a shaft on which turn loosely the rotary and oscillatory gear between which is a clutch feathered on the shaft. The clutch is provided with keys which are adapted to engage recesses in the respective gears. Owing to the fact that the needle cylinder turns much more rapidly when rotating than at its maximum speed when oscillating, the two gears are necessarily traveling at substantially different rates of speed when the shift is made. Hence, although the keys and the recesses engaged thereby are tapered to permit of the shift being made, the shift must be made with great rapidity. This not only causes a severe jar to the machine, but to throw the clutch with sufficient quickness, a steep actuating cam must be used, which requires considerable power to operate and imposes a severe strain upon the machine.

In equivalent constructions, the keys are placed on the gears and the engaging recesses in the clutch; or the clutch is fixed on the shaft and the gears are shifted. These constructions are open to the same objections as those above noted.

Briefly, the objects of my invention are to allow the shift to be made through the medium of a cam having a gentle slope, to minimize the shock or jar to the machine, and to avoid the use of beveled or tapered keys and recesses.

A preferred embodiment of my invention is shown in the accompanying drawings, in which—

Figure 4:
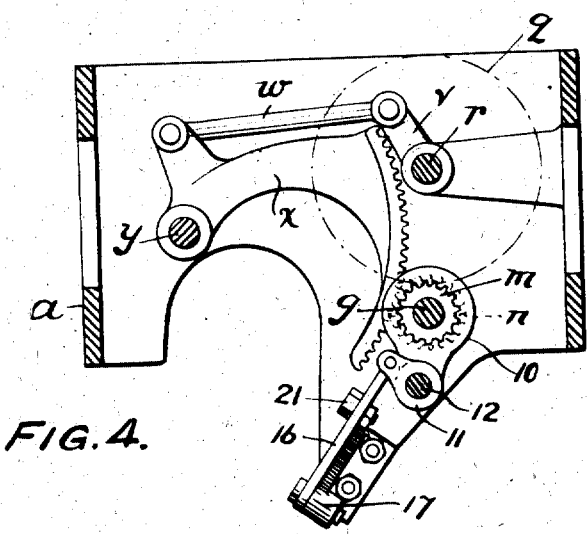
Figure 7:
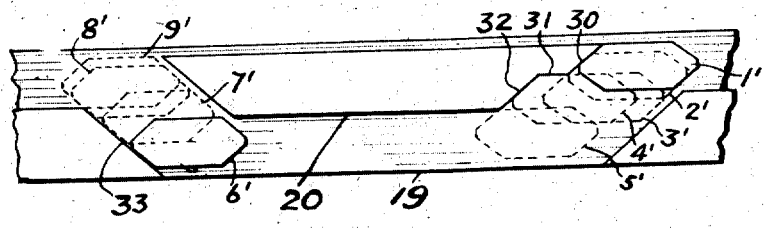
Figure 8:
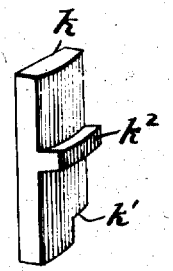
Figure 3:
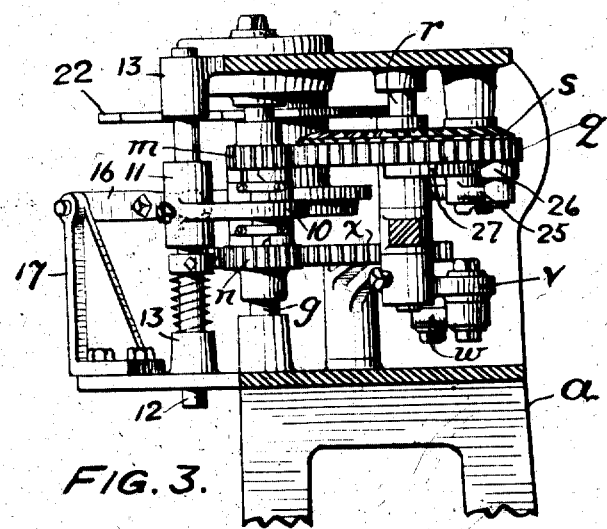

Figure 1 is a section plan view of the machine on the line 1—1 of Fig. 2. Fig. 2 is a side elevation of the machine, partly broken away. Fig. 3 is a vertical sectional view on the line 3—3 of Fig. 2. Fig. 4 is a partial plan sectional view, similar to Fig. 1, but with parts omitted for clearness. Fig. 5 is an elevation, partly in section, of the clutch shifting mechanism. Fig. 6 is a cross section through the clutch shaft, clutch keys and intermediate sleeve. Fig. 7 is a front view of the cams for effecting the shift of the shoe on the clutch shifting lever. Fig. 8 is a perspective view of one of the clutch keys. Figs. 9 and 10 are diagrams illustrating, respectively, the shift of the clutch from rotation to oscillation and from oscillation to rotation.

The frame $a$ of the machine carries the bed plate $b$ for the needle cylinder, cam ring and appurtenant mechanism. The needle cylinder $c$ has secured to its lower end the driven gear $d$ resting directly upon a ring within the bed $b$.

Gear $d$ is driven through idler $e$ from gear $f$ on clutch shaft $g$, on which are loosely sleeved two pinions $m$ and $n$, one of which constantly rotates while the other constantly oscillates. Between these pinions is a sleeve $j$ fixed on the shaft. This sleeve has two longitudinal recesses in which slide clutch keys $k$ adapted to engage recesses $h$ and $i$ in the pinions $m$ and $n$. These keys and recesses will be hereinafter more particularly described. For present purposes it is sufficient to state that by moving the clutch keys up, they are engaged with the rotary pinion $m$, thereby causing the shaft $g$ and the needle cylinder $c$ to rotate; and by moving the clutch keys down, they are engaged with the oscillatory pinion $n$, thus causing the shaft $g$ and the needle cylinder $c$ to oscillate.

The means for constantly rotating the pinion $m$ and constantly oscillating the pinion $i$ are the same as that set forth in an application filed by me September 22, 1915, Serial No. 51,939, and will now be briefly described.

Pinion $m$ is driven by a spur gear $q$ turning on a vertical shaft $r$ and having attached to it a bevel gear $s$ which is driven by a bevel pinion $t$ on driving shaft $u$.

Pinion $n$ is driven by the following means: To the lower end of shaft $r$ is secured a crank $v$ connected by a link $w$ with an arm of a quadrant $x$, which is mounted upon a post $y$ and constantly engages pinion $n$.

The clutch keys $k$ are provided with lateral projections $k^2$ which engage recesses in a ring 10 encircling the sleeve $j$. This ring is carried by a hub 11 secured to an upright rod 12 vertically slidable in upper and lower bearings 13 on the machine frame $a$. Hub 11 is provided with lugs 14, in which are threaded adjusting screws 15, between the opposing heads of which is confined one end of a lever 16. The other end of lever 16 is pivotally mounted on a bracket 17 secured to the machine frame.

Mounted on the lower extension of the bed plate $b$, and concentrically beneath the needle cylinder, is the sleeve 18 provided with the flange 19. Secured to the periphery of this flange are cams 20 (to be hereinafter more particularly described), forming a cam path engaging a shoe 21 on lever 16. When shoe 21 is under the upper cams, sleeve 11 and clutch keys $k$ are lowered and shaft $g$ and needle cylinder $c$ are oscillated. When shoe 21 is over the lower cams, sleeve 11 and clutch keys $k$ are raised and the shaft $g$ and needle cylinder $c$ are rotated.

Sleeve 18 carries a disk 22 with ratchet teeth on its outer circumference. Engaging these teeth is a spring-pressed pawl 23 mounted on a slide 24, one end of which is pivotally connected with a lever 25. This lever is mounted on a vertical axis between its ends and carries a roller 26 engaging a cam 27 secured to the under side of the constantly rotating gear $q$. A spring 28 tends to hold the roller constantly against the cam.

Pattern mechanism (not herein shown, but set forth in detail in my prior application hereinbefore mentioned) normally holds the slide 24 in its forward position to prevent roller 26 from being acted upon by cam 27; but when the pattern mechanism releases slide 24, it is first retracted by spring 28 and then advanced by cam 27, thereby causing pawl 23 to turn disk 22 a distance of one tooth.

At predetermined fractional turns of disk 22, and with it sleeve 18 and flange 19, one or the other of the cams 20 acts upon shoe 21 to effect the clutch shifting operation hereinbefore described.

Having now described the needle cylinder actuating and clutch shifting mechanism, I shall, with more particularity, describe the way in which the clutch keys engage the rotary and oscillatory pinions and shall also explain how such operation of the clutch keys is effected by the cams 20 and shoe 21.

The diagram of Fig. 9 shows five different transition positions of one of the clutch keys $k$ in its shift out of engagement with the rotary pinion and into engagement with the oscillatory pinion. The arrows indicate the direction of movement of the driving pinions at the time of shift.

In position 1, the key is in engagement with the rear wall of the recess $h$ in rotary pinion $m$. The key is just starting to shift. It will be noticed that the recess $i$ in oscillatory pinion $n$ is slightly in advance of recess $h$ and is therefore not quite in alinement with the key. When, however, the lower end of the key has moved downward just below the upper face of the pinion $n$, as shown in position 2, the pinion $m$, which moves the faster, has carried the recess $h$ slightly in advance of recess $i$. Although the width of the key $k$ and recess $i$ are substantially the same, the key is free to enter the recess owing to the cut-away portion $k'$ at the lower front corner of the key. In position 3, the key has moved still farther downward until it is just disengaged from recess $h$, which has advanced still farther relatively to recess $i$.

Bearing in mind that the key is actuated by the actuation of shoe 21 by the cams 20, reference should be made to Fig. 7, in which I have indicated, by the reference letters $1'$ to $9'$ inclusive, the several positions, in transit, of the shoe 21 corresponding respectively to the several positions 1 to 9 inclusive of the key and pinions in Figs. 9 and 10. It will be noted, on Fig. 7, that the upper cam 20 is not provided with a continuous cam face, but with two successive cam faces 30 and 32 connected by a horizontal face 31. Therefore, the shoe 20 is not moved down steadily, but is moved down part way (positions $1'$, $2'$ and $3'$) and then stops until the lower face 32 of the cam has caught up to and engaged it (position $4'$). Positions $3'$ and $4'$ of the shoe are, of course, identical, the cams being the circumferentially movable elements and not the shoe; the shoe being shown in Fig. 7 as the movable element for convenience in illustration. Hence it will be understood why, in Fig. 9, the key is shown as stationary between positions 3 and 4, while the pinions are shown as having moved forwardly. It is between these positions that the rear wall of recess $i$ catches up to the shoe and strikes it. Thereafter, the key is driven by pinion $n$. The key continues to move downward until it reaches position 5, wherein its cut away portion $k'$ has passed substantially below the upper wall of the pinion, thereby confining the key closely within the recess $i$. This is necessary in order to avoid lost motion when the pinion $n$ reverses its direction of movement.

The reverse movement of the shoe, to effect the shift from oscillation to rotation, is accomplished by a single cam face 33 on the lower cam 20, as shown in Fig. 7. The number of positions of the shoe, key and pinions are, in this figure and in Fig. 10, shown as 10 four. It will be understood that the number of transition periods shown is somewhat arbitrary, although, in fact, the number shown is best adapted to illustrate the actual operation.

In position 6, the key has just started to shift. The oscillatory pinion $n$ is considerably in advance of the rotary pinion $m$.

In position 7 the pinion $m$ has just about caught up to the pinion $n$ and the upper end of the key is just ready to enter the recess $h$. Immediately after this position is reached, the key, while continuing to move up, is actuated by the pinion $m$ and therefore recedes from the rear wall of the recess $i$ of the more slowly turning pinion $n$; the cut-away portion $k'$ of the key permitting this movement. See Fig. 8. In position 9, the key has moved up to its farthest extent and the lower end of the key has completely cleared the recess $i$.

The front wall of the recess $h$ is shown as cut away at $h'$. This is not strictly necessary, but is advantageous in that it permits some latitude of adjustment. On the other hand, the recess $h$ need not be provided with any front wall, inasmuch as the pinion $m$ always turns in the same direction.

From the foregoing description it will be clear that the shift between rotation and oscillation may be effected by cams of gentle slope and without strain or jar upon the machine.

Having now fully described my invention, what I claim and desire to protect by Letters Patent is:—

1. In a clutch shifting mechanism, the combination with a driven shaft, of a rotary member and an oscillatory member each provided with a recess, means to rotate the rotary member at a higher speed than the maximum speed of the oscillatory member, a clutch key turning with the shaft, means for moving the key out of engagement with the recess of one member and into engagement with the recess of the other member, said key having front and rear parallel walls adapted to fit within similar parallel walls in the oscillatory member, the lower portion of the front wall of the key being cut away to permit the key to enter the recess in the oscillatory pinion while still being driven by the rotary gear.

2. In clutch shifting mechanism, the combination with a driven shaft, of a rotary member and an oscillatory member each provided with a recess, means to rotate the rotary member at a higher speed than the maximum speed of the oscillatory member, a clutch key turning with the shaft, means for moving the key out of engagement with the recess of one member and into engagement with the recess of the other member, a cam and means to turn the same, a member adapted to be actuated by the cam, and connections between said member and the clutch key for shifting the key, said cam having an interrupted cam face adapted to determine the shift from rotation to oscillation, whereby the movement of the clutch key, when passing from the rotary member to the oscillatory member, will be temporarily arrested to allow the recess in the oscillatory pinion to move into a position directly opposite the clutch key to permit the shift of the key to be completed.

3. In a clutch shifting mechanism, the combination with a driven shaft, of a rotary member and an oscillatory member each provided with a recess, means to rotate the rotary member at a higher speed than the maximum speed of the oscillatory member; a clutch key turning with the shaft, means for moving the key out of engagement with the recess of one member and into engagement with the recess of the other member, said key having front and rear parallel walls adapted to fit within similar parallel walls in the oscillatory member, the lower portion of the front wall of the key being cut away to permit the key to enter the recess in the oscillatory pinion while still being driven by the rotary gear, a cam and means to turn the same, a member adapted to be actuated by the cam, and connections between said member and the clutch key for shifting the key, said cam having an interrupted cam face adapted to determine the shift from rotation to oscillation, whereby the movement of the clutch key, when passing from the rotary member to the oscillatory member, will be temporarily arrested; after the key has been disengaged from the rotary member and has partly entered the recess in the oscillatory pinion, to allow the last named recess to catch up to the key and permit the latter to complete its movement.

4. In a clutch shifting mechanism, the combination with a driven shaft, of a rotary member and an oscillatory member loose on the shaft, a clutch key turning with the shaft and adapted to slide along the shaft out of engagement with one member and into engagement with the other member, a non-rotary ring in which the said key is feathered to permit it to turn with the shaft, a device carrying the ring and adapted to move it along the shaft, a clutch shifting lever for moving said device, a cam, and a shoe on the lever adapted to be actuated by the cam.

5. In a clutch shifting mechanism, the combination with a driven shaft, of a rotary member and an oscillatory member loose on the shaft, a clutch between said members and movable into driving engagement with either, a device alongside the shaft movable in the direction thereof and connected with the clutch so as to shift the same, projections on said device, screws in said projections, a lever confined between said screws, a shoe on the lever, and a cam adapted to engage the shoe and thereby, through said lever and said device, shift the clutch.

6. In a clutch shifting mechanism, the combination with a driven shaft, of a rotary member and an oscillatory member, means to rotate the rotary member at a higher speed than the maximum speed of the oscillatory member, a clutch turning with the shaft, means to shift the clutch relatively to said members, to engage it with one or the other thereof, said clutch and the oscillatory member being provided one with a key and the other with a recess, said key and recess each having parallel walls and the key having a relatively neat fit in the recess, one of the two last named elements being cut away to permit relative forward movement of the key and recess during the partial insertion of the key in the recess while the clutch is still being driven by the rotary member.

7. In a clutch shifting mechanism, the combination with a driven shaft, of a rotary member and an oscillatory member, means to rotate the rotary member at a higher speed than the maximum speed of the oscillatory member, a clutch turning with the shaft, means to shift the clutch relatively to said members, to engage it with one or the other thereof, said clutch and the oscillatory member being provided one with a key and the other with a recess, said key and recess each having parallel walls and the key having a relatively neat fit in the recess, one of the two last named elements being cut away to permit relative forward movement of the key and recess during the partial insertion of the key in the recess while the clutch is still being driven by the rotary member, clutch actuating means, and a cam for actuating said means shaped to cause a dwell in the shift of the clutch to permit the partially inserted key and said recess to be brought into alinement after the clutch has been disengaged from the rotary member.

8. In a clutch shifting mechanism, the combination with a driven shaft, of a rotary member and an oscillatory member, means to rotate the rotary member at a higher speed than the maximum speed of the oscillatory member, a clutch turning with the shaft, means to shift the clutch relatively to said members, to engage it with one or the other thereof, said clutch and the oscillatory member being provided one with a key and the other with a recess, clutch actuating means, and a cam for actuating said means shaped to cause a dwell in the shift of the clutch after the clutch has begun, and before it has completed, its shift, to permit the key and said recess to be brought into alinement after the clutch has been disengaged from the rotary member.

In testimony of which invention, I have hereunto set my hand, at Philadelphia, on this 18th day of July, 1916.

HARRY A. HOUSEMAN.